United States Patent
Tesfaye

(12) 
(10) Patent No.: US 6,314,906 B1
(45) Date of Patent: Nov. 13, 2001

(54) BOAT STRUCTURE INCLUDING IRIDESCENT PARTICLES

(75) Inventor: Emmanuel Tesfaye, Gurnee, IL (US)

(73) Assignee: Genmar Holdings, Inc., Minneapolis, MN (US)

( * ) Notice: Subject to any disclaimer, the term of this patent is extended or adjusted under 35 U.S.C. 154(b) by 0 days.

(21) Appl. No.: 09/317,478

(22) Filed: May 24, 1999

(51) Int. Cl.$^7$ .................................................. B63B 5/24
(52) U.S. Cl. ............................................................ 114/357
(58) Field of Search ............................................ 114/357

(56) References Cited

U.S. PATENT DOCUMENTS

| | | | |
|---|---|---|---|
| 3,775,214 | * 11/1973 | Winters | 156/245 |
| 4,683,134 | * 7/1987 | Palinczar | 424/59 |
| 5,664,518 | * 9/1997 | Lewit et al. | 114/357 |
| 5,871,827 | * 2/1999 | Jaffe et al. | 428/29 |
| 5,956,888 | * 9/1999 | Vreeland et al. | 43/42.53 |
| 6,032,606 | * 3/2000 | Fulks | 114/357 |

OTHER PUBLICATIONS

"OMC Hydra–Sports" Catalog. OMC Fishing Boat Group, Inc. 1992. pp 1–2.*
"America's Star Performer" Catalog. Astro Boats (of Brunswick Corp.) 1990. pp5–6.*
Merriam–Webster's Collegiate Dictionary, 10th Ed., 1998, Merriam–Webster, Inc., pp. 618, 694.*
"Meadowbrook Inventions, Inc." Internet Webpage (http://www.meaddowbrookinventions.com/index2.html). Meadowbrook Inventions, Inc. 1999. pp 1–3.*

* cited by examiner

Primary Examiner—S. Joseph Morano
Assistant Examiner—Andrew Wright
(74) Attorney, Agent, or Firm—Armstrong Teasdale LLP

(57) ABSTRACT

A multilayered fiberglass boat structure is described. The fiberglass boat structure includes a plurality of layers of resin impregnated fiberglass reinforcement and a plurality of layers of a polyester film. Each film layer is formed from a gelcoat, with at least one of the film layers formed from a gelcoat that includes iridescent polyester particles.

9 Claims, 2 Drawing Sheets

BOAT STRUCTURE INCLUDING IRIDESCENT PARTICLES

BACKGROUND OF THE INVENTION

This invention relates generally to boats and more particularly, to multilayered fiberglass boats fabricated with a gelcoat that includes iridescent polyester particles.

Multilayered fiberglass boat structures typically are fabricated with outer layers formed by spraying gelcoats onto a mold. The gelcoat outer layers provide a smooth glossy outer surface. Additionally, pigmentation may be added to the gelcoats to provide an outer surface of a desired color. To provide high glamour colors, specialty pigments such as aluminum flakes and mica flakes are added to the gelcoat formulation. The "metallic" look of aluminum flakes and mica flakes are sometimes used to attract fish on fishing boats. The flakes reflect light into the water and create a sparkle which attracts some varieties of fish.

There is a desire in the fiberglass boat manufacturing industry for more and different "flashy" appearances for fiberglass boat structures. Accordingly, it would be desirable to provide a multilayered fiberglass boat structure having a different glittering appearance than the appearance achieved with aluminum flake and mica pigments.

BRIEF SUMMARY OF THE INVENTION

These and other objects may be attained by a multilayered fiberglass boat structure that includes a plurality of layers of resin impregnated fiberglass reinforcement and a plurality of layers of a polyester film wherein each film layer is formed from a gelcoat, with at least one of the film layers formed from a gelcoat that includes iridescent polyester particles. The boat structure includes the hull, the deck and any miscellaneous small parts. Particularly, and in one embodiment, the multilayered fiberglass boat structure includes an outer layer of a polyester film formed from a clear gelcoat. The fiberglass boat structure also includes a second layer, located immediately adjacent to the outer layer, of a polyester film formed from a gelcoat that includes iridescent polyester particles. A third layer, located immediately adjacent the second layer, is a polyester film formed from a gelcoat that includes at least one pigment. The third layer is typically referred to as a "backup color" layer.

The multilayered fiberglass boat structure is fabricated by first preparing a boat mold having a smooth interior surface and then spraying the clear gelcoat onto the interior surface of the mold to form the outer film layer. The gelcoat having the iridescent polyester particles is then sprayed onto the outer polyester film layer to form the second film layer. Next, the gelcoat having at least one pigment is sprayed onto the second film layer to form the third film layer.

At least one layer of resin impregnated fiberglass reinforcement made from randomly arranged fiberglass fibers is applied over the third film layer. The first layer of resin impregnated fiberglass reinforcement applied over the third film layer is permitted to cure and harden before subsequent layers of fiberglass reinforcement are applied. After curing, the boat structure is removed from the mold.

The above described multilayered fiberglass boat structure includes a layer of gelcoat having iridescent polyester particles that impart a unique glitter appearance to the fiberglass boat structure different from the appearance obtained with aluminum flake or mica pigments.

DETAILED DESCRIPTION OF THE INVENTION

Figure 1:
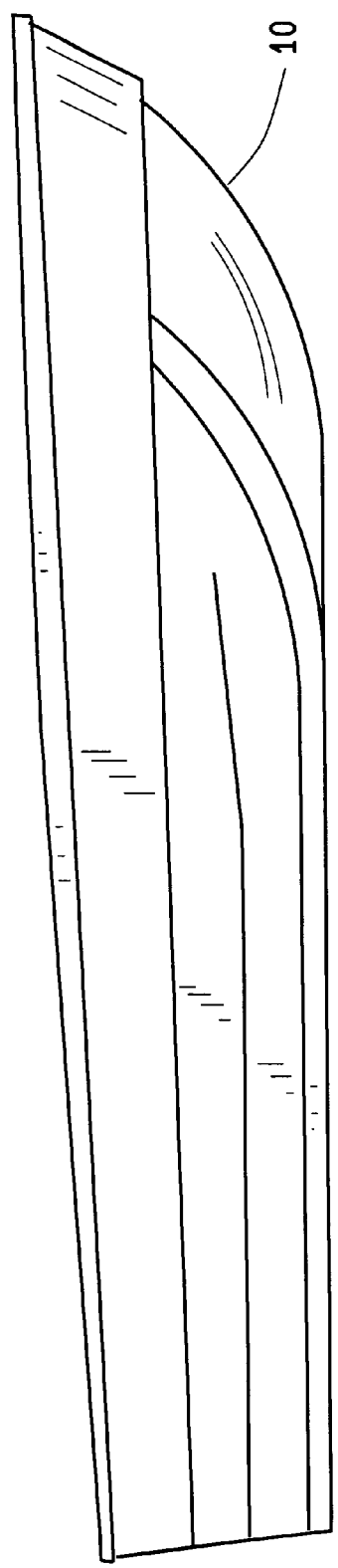
FIG. 1 is a perspective view of a multilayered fiberglass boat structure in accordance with an embodiment of the present invention.
Figure 2:
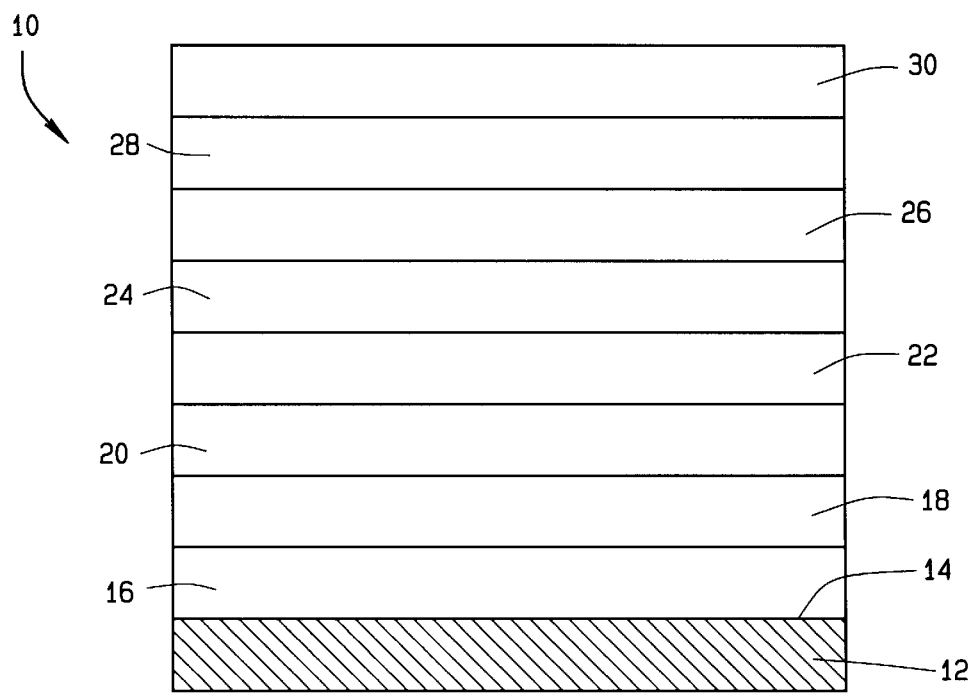
FIG. 2 is a cross-section of the multilayered fiberglass boat structure shown in FIG. 1 prior to removal from a boat structure mold.

FIG. 1 is a perspective view of a multilayered fiberglass boat structure 10, and FIG. 2 is a cross-section of boat structure 10 prior to removal from a boat structure mold 12 constructed in accordance with one embodiment of the present invention. Mold 12 can be one of many known boat structure molds and includes a smooth interior surface 14. Multilayered fiberglass boat structure 10 includes a plurality of polyester film layers and a plurality fiberglass layers. Particularly, fiberglass boat structure 10 includes an outer polyester film layer 16 formed from a clear gelcoat. Fiberglass boat structure 10 also includes a second layer 18 of a polyester film formed from a second gelcoat that includes iridescent polyester particles. Second layer 18 is located immediately adjacent to outer film layer 16. A third layer 20 of a polyester film is formed from a third gelcoat that includes at least one pigment. Third film layer 20 is located immediately adjacent second film layer 18.

Located immediately adjacent to third film layer 20 is first fiberglass layer 22. Fiberglass layer 22 is formed from a 1.5 ounce fiberglass mat or spray applied chopped fiberglass fibers impregnated with an unsaturated polyester resin. A second fiberglass layer 24 is located immediately adjacent to first fiberglass layer 22. Second fiberglass layer 24 is formed from any suitable fiberglass reinforcement, including, but not limited to a fiberglass mat, woven fiberglass, and a combination mat and woven fiberglass reinforcement. The fiberglass reinforcement may be any suitable weight. Second fiberglass layer 24 also is impregnated with the unsaturated polyester resin. First fiberglass layer 22 is permitted to cure and harden before second fiberglass layer 24 is applied. Typically first fiberglass layer 22 requires between about 0.5 hour to about 1.5 hours to develop the desired hardness.

Fiberglass boat structure 10 further includes a third fiberglass layer 26 located immediately adjacent second fiberglass layer 24, a fourth fiberglass layer 28 located immediately adjacent third fiberglass layer 26, and a fifth fiberglass layer 30 located immediately adjacent fourth fiberglass layer 28. Third, fourth, and fifth fiberglass layers 26, 28, and 30, like second fiberglass layer 24 is formed from any suitable weight fiberglass reinforcement, including, but not limited to a fiberglass mat, woven fiberglass, and a combination mat and woven fiberglass reinforcement. In alternate embodiments, fiberglass boat structure 10 may include more than five fiberglass layers or less than five fiberglass layers. Additionally, fiberglass boat structure 10 may include additional pigmented gelcoat layers located on the last fiberglass layer or between fiberglass layers.

Outer film layer 16, second film layer 18, and third film layer 20 each have a film thickness of about 2 mils to about 20 mils. In one embodiment, layers 16, 18, and 20 have a film thickness of about 5 mils to about 10 mils.

Gelcoats suitable for forming the polyester film layers of structure 10 may be formulated from unsaturated polyester resins and are commercially available under the trade name Gold Series Gelcoats from Cook Composites and Polymers, Inc., Kansas City, Mo. Such gelcoats may also include pigments to impart a color or may be clear, i.e., do not contain pigments. Suitable pigments used in gelcoats include organic pigments and inorganic pigments, and may also include glamour or "metallic" pigments such as aluminum flakes, bronze flakes, coated mica, nickel flakes, tin flakes, silver flakes, copper flakes, or combinations thereof. Typically, pigments are incorporated into the gelcoat formulation by the gelcoat manufacturer. Usually, pigments need to be "ground" into a coating formulation with a pigment grinding mill such as a sand mill, a ball mill, an attriter, or the like.

Suitable iridescent polyester particles are fabricated by cutting iridescent polyester films into flakes or particles. The iridescent films are complex structures and typically contain more than 100 layers with a total thickness of about 1.0 mil or less. Iridescent polyester films and iridescent polyester particles are commercially available from Englehard Corporation, Pigments and Additives Group, Iselin, N.J. The iridescent polyester particles do not have to be ground into a gelcoat like a pigment.

To incorporate the iridescent polyester particles into a gelcoat, the following steps are followed. First, a predetermined amount of a clear gelcoat is weighed out into a container and then a suitable thinner is added to the gelcoat to reduce the viscosity of the gelcoat to permit spraying of the gelcoat. Typically, the thinner includes a mixture of aromatic solvents such as, for example acetone, toluene, and the like. Suitable thinners are commercially available from Cook Composites and Polymers, Inc., Kansas City, Mo. The amount of thinner, or solvent, added is usually in a range between about 5 to about 20 percent by weight, and more typically in a range between about 10 to about 15 percent by weight, with the percentage based on the weight of the gelcoat. The solvent and gelcoat mixture is then mixed for between about 10 seconds to about 5 minutes, and more typically between about 20 seconds to about 1 minute.

The gelcoat and solvent mixture is weighed, and then iridescent polyester particles are added to the mixture. The amount of iridescent particles added is between about 0.5 to about 25 percent by weight, and more typically between about 5 to 15 percent by weight, with the percentages based on the weight of the gelcoat and solvent mixture. However, a smaller amount or a larger amount of iridescent particles may be used depending on the desired appearance. The solvent, gelcoat, and iridescent polyester particle mixture is then mixed for between about 10 seconds to about 5 minutes, and more typically between about 20 seconds to about 1 minute. The gelcoat, solvent, and iridescent particle mixture is weighed, and then a suitable amount of catalyst is added to the mixture. Typically, about 1.0 to 4.0 percent by weight, and more typically about 1.5 to about 3.0 percent by weight of catalyst is added, with the percentage based on the weight of the gelcoat, solvent, and iridescent particle mixture. The mixture is then mixed for between about 10 seconds to about 5 minutes, and more typically between about 20 seconds to about 1 minute prior to spray applying the gelcoat. Any suitable catalyst may be added to the gelcoat. For example, an organic peroxide catalyst such as LUPERSOL DDM9, commercially available from Elf Autochem, North America, Inc. may be used.

The gelcoats used to form the polyester film layers in this invention can be applied using one of many known methods, including brushing, flow coating, spraying and the like, but are most often applied by spraying. Known techniques and equipment for spraying and electrostatic spraying may be used. The spray method may be either manual or automatic.

Multilayered fiberglass boat structure 10 is fabricated by first preparing smooth interior surface 14 of boat structure mold 12. Particularly, interior surface 14 is cleaned and then a suitable mold release agent, as is known, is applied to surface 14 to provide for the easy separation of boat structure 10 from mold 12. The clear gelcoat is then sprayed onto interior surface 14 of mold 12 to form outer polyester film layer 16. After a suitable dry or tack time of, for example, about 20 minutes to about 30 minutes, the second gelcoat is sprayed onto outer polyester film layer 16 to form second film layer 18. Second film layer 18 is allowed to dry or tack for about 20 minutes to about 30 minutes, and then the third gelcoat is sprayed onto second film layer 18 to form third film layer 20. Third film layer 20 is allowed to cure for about 45 minutes to about 60 minutes Next, first fiberglass layer 22 is applied onto third film layer 20. First fiberglass layer 22 is then allowed to cure for about 0.5 hour to about 1.5 hours. Second fiberglass layer 24 is applied onto first fiberglass layer 22, third fiberglass layer 26 is then applied onto second fiberglass layer 24, fourth fiberglass layer 28 is the applied onto third fiberglass layer 26 and fifth fiberglass layer 30 is applied to fourth fiberglass layer 28. Second, third, fourth, and fifth fiberglass layers 24, 26, 28 and 30 are then allowed to cure for about 1 hour to about 1.5 hours. After curing, multilayered fiberglass boat structure 10 is removed from mold 12.

The above described multilayered fiberglass boat structure 10 includes polyester film layer 18 having iridescent polyester particles that impart a unique glitter appearance to fiberglass boat structure 10 that is different from the appearance obtained with aluminum flake or mica pigments. Such unique appearance enhances the aesthetic appearance of the boat and is pleasing to at least some boat operators.

Additionally, multilayered fiberglass boat structure 10 may be easily repaired in the event of damage. A repair kit to be used for repairing fiberglass boat structure 10 may include, for example, clear gelcoat, iridescent polyester particles, solvent, catalyst, fiberglass mat, and polyester resin. Also, gelcoat containing at least one pigment may be included in a repair kit.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A method of fabricating a multilayered fiberglass boat structure using a boat structure mold, said method comprising the steps of:

spraying a clear gelcoat onto the interior surface of the mold to form an outer film layer;

spraying a second gelcoat onto the outer film layer to form a second film layer, the second gelcoat comprising iridescent polyester particles; and spraying a third gelcoat onto the second film layer to form a third film layer, the third gelcoat comprising at least one pigment.

2. A method in accordance with claim 1 further comprising the step of applying at least one layer of resin impregnated fiberglass reinforcement onto the third film layer.

3. A method in accordance with claim 1 wherein the second gelcoat comprises the clear gelcoat and between about 0.5 percent to about 25 percent by weight of iridescent polyester particles, the percentage based on total weight of the clear gelcoat.

4. A method in accordance with claim 1 wherein the second gelcoat comprises the clear gelcoat and between about 5 percent to about 15 percent by weight of iridescent polyester particles, the percentage based on total weight of the clear gelcoat.

5. A method in accordance with claim 1 further comprising the steps of:

cleaning the interior surface of the mold; and spraying a mold release agent on the interior of the mold.

6. A method in accordance with claim 1 wherein spraying the second gelcoat onto the outer film layer comprises the steps of:

weighing out a predetermined amount of the clear gelcoat into a container;

adding between about 10 percent to about 15 percent by weight of a solvent to the clear gelcoat, the percentage based on the weight of the clear gelcoat in the container;

mixing the clear gelcoat and solvent mixture for between about 10 seconds to about 5 minutes;

weighing the clear gelcoat and solvent mixture;

adding between about 5 percent to 15 percent by weight of iridescent polyester particles, the percentage based on the weight of the clear gelcoat and solvent mixture;

mixing the clear gelcoat, solvent, and iridescent particle mixture for between about 10 seconds to about 5 minutes;

weighing the clear gelcoat, solvent, and iridescent particle mixture;

adding between about 1.0 percent to about 4.0 percent by weight of catalyst, the percentage based on the weight of the clear gelcoat, solvent, and iridescent particle mixture;

mixing the clear gelcoat, solvent, and iridescent particle mixture for between about 10 seconds to about 5 minutes; and spraying the clear gelcoat, solvent, iridescent particle, and catalyst mixture onto the outer film layer.

7. A method of fabricating a multilayered fiberglass boat structure using a boat structure mold having an interior surface, said method comprising the steps of:

forming a plurality of polyester film layers by applying a gelcoat onto the interior surface of the mold, wherein at least one polyester film layer is formed by applying a gelcoat comprising iridescent polyester particles; and forming at least one fiberglass layer by applying resin impregnated fiberglass reinforcement onto a previously formed layer.

8. A method in accordance with claim 7 further comprising the step of forming at least one polyester film layer by applying a gelcoat comprising at least one pigment onto a previously formed layer.

9. A method in accordance with claim 7 wherein the gelcoat comprising iridescent polyester particles comprises a clear gelcoat and from about 0.5 to about 25 percent by weight of iridescent polyester particles, the percentage based on total weight of the clear gelcoat.

* * * * *